Nov. 6, 1934.  C. R. ADAMS  1,980,027
STRAW GATHERING ATTACHMENT FOR HARVESTERS
Filed July 5, 1933   3 Sheets-Sheet 1
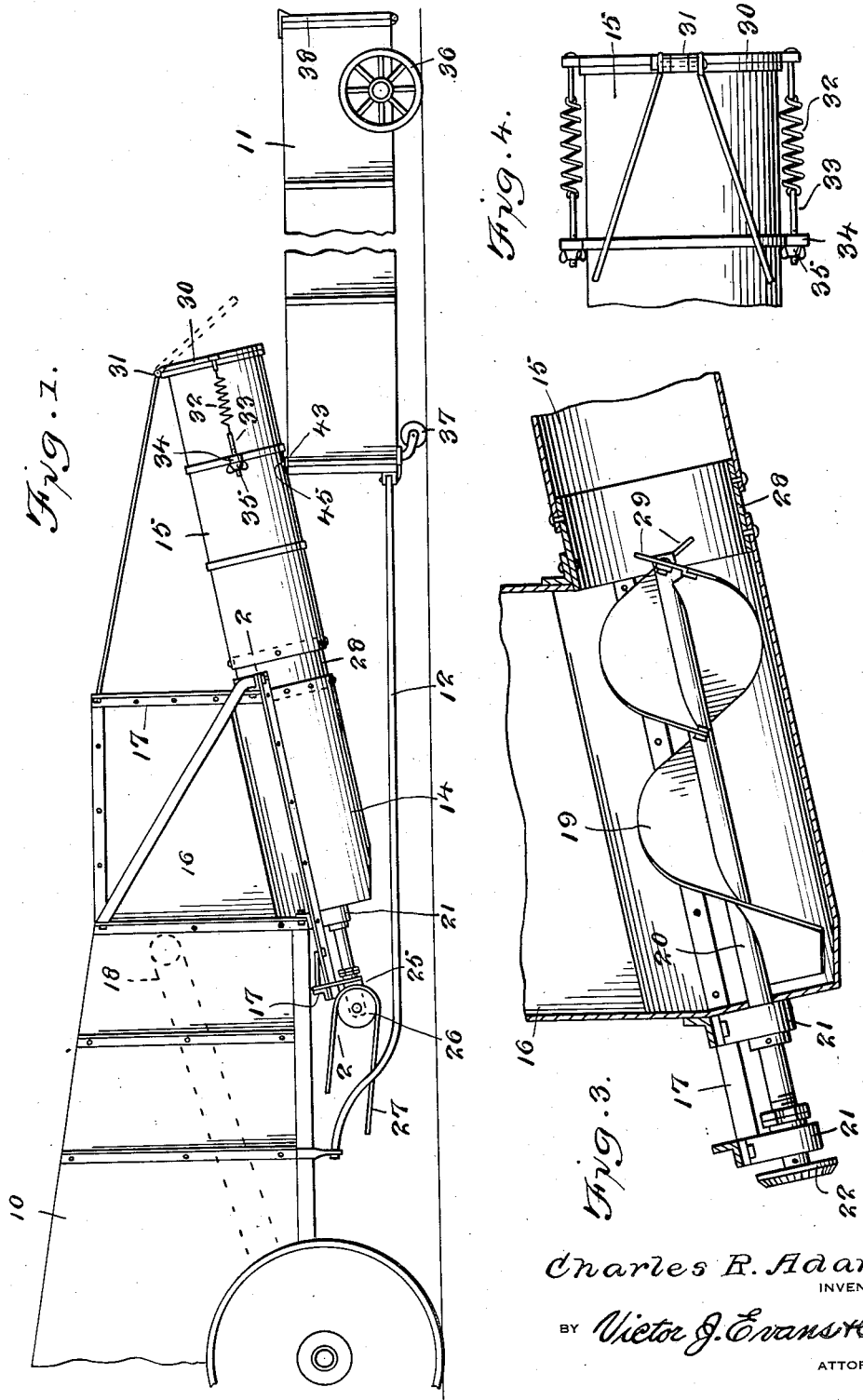
Charles R. Adams
INVENTOR
BY Victor J. Evans & Co.
ATTORNEY

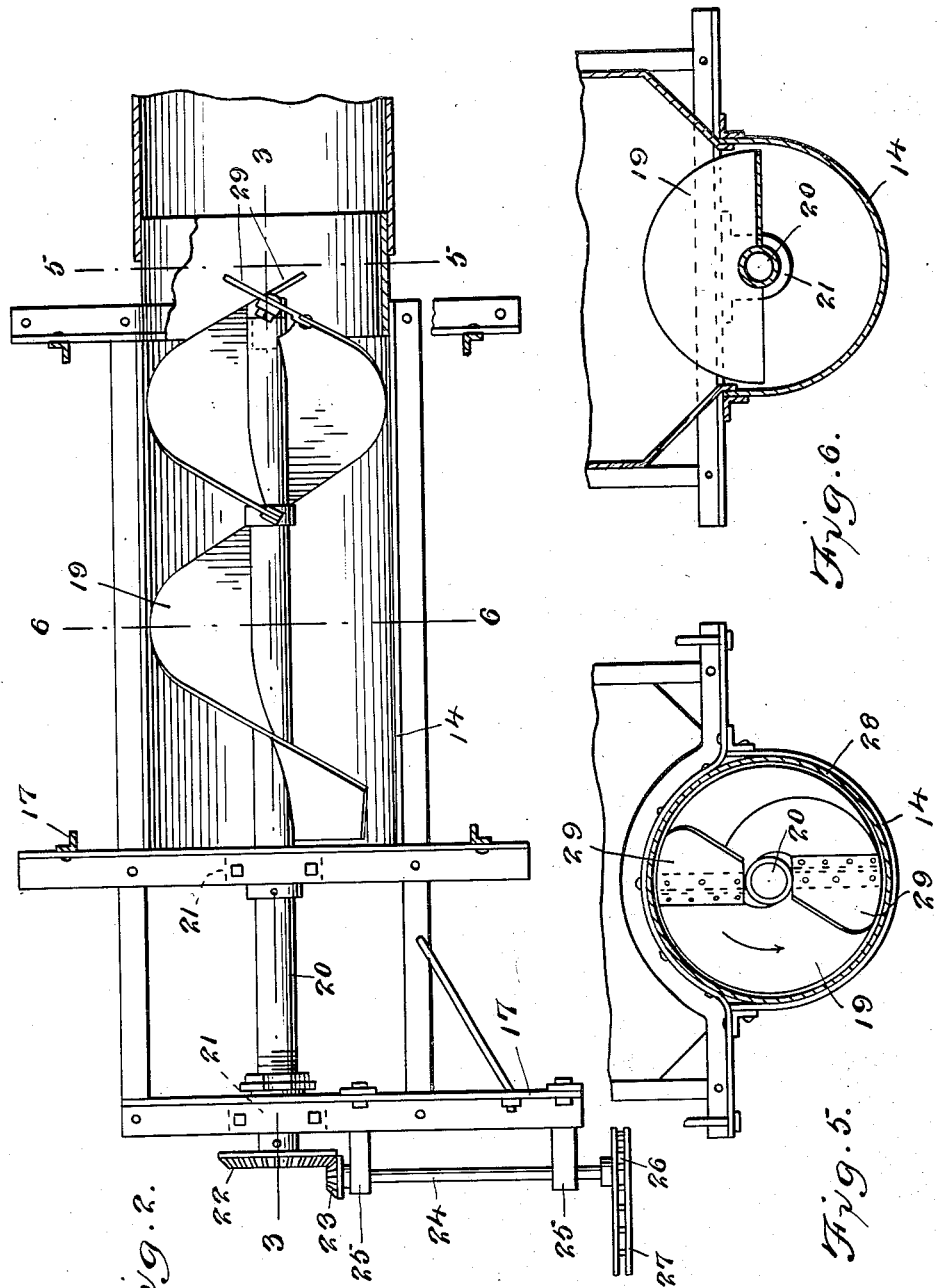

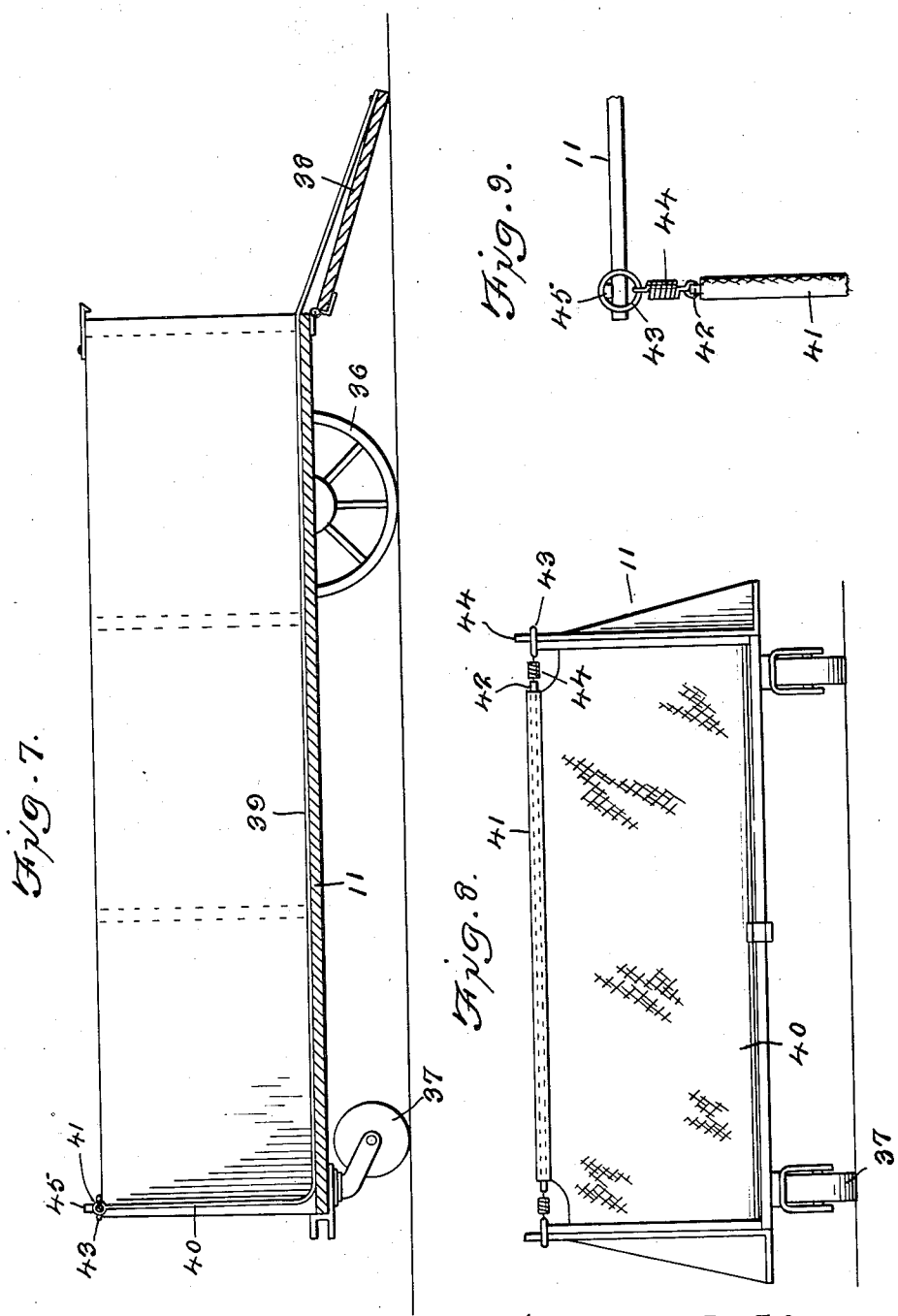

Patented Nov. 6, 1934

1,980,027

UNITED STATES PATENT OFFICE 1,980,027

STRAW GATHERING ATTACHMENT FOR HARVESTERS

Charles R. Adams, Donovan, Saskatchewan, Canada

Application July 5, 1933, Serial No. 679,142

6 Claims. (Cl. 56—122)

The object of the invention is to provide an attachment for use in connection with combination harvesters to be applied to the latter as a trailing device, so as to receive the straw produced in the harvesting of the grain and to deposit the straw in more or less compact masses as distinguished from the loose condition in which it is usually deposited on the ground by such harvesters; to provide a trailing attachment for combination harvesters in which the dumping of the trailer may be accomplished in a minimum of time at the point where it is desired to deposit the contained straw; to provide a means for feeding straw to the trailer from the harvester, so that it is more or less compressed into mass form prior to depositing into the trailer; and generally to provide a device of the kind indicated which is of simple form and susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claims.

In the drawings:

Figure 1 is a side elevational view of the rear end of a combination harvester showing the invention operatively connected therewith.

Figure 2 is a sectional view on the plane indicated by the line 2—2 of Figure 1.

Figure 3 is a sectional view on the plane indicated by the line 3—3 of Figure 2.

Figure 4 is a top plan view of the mouth end of the discharge chute.

Figures 5 and 6 are sectional views on the planes indicated by the lines 5—5 and 6—6 respectively of Figure 2.

Figure 7 is a vertical longitudinal sectional view through the trailer, with the tail gate in lowered position.

Figure 8 is a front elevational view of the trailer.

Figure 9 is a detail plan view showing the means for removably securing the flexible front wall of the trailer in position.

Designed as an attachment for a combination harvester such as that indicated at 10, the invention comprises a trailer 11 having a draft tongue 12 at its forward end by means of which it is connected to the harvester but in such a way as to be spaced materially from the rear end of the latter, so as to provide space for the conveyor 14 and its attendant discharge chute 15. The conveyor 14 comprises a tubular housing disposed with its open top side in communication with the lower end of a chute 16, the tubular housing and the chute being mounted on an appropriate frame 17 connected with the harvester at the rear end, so that the straw carrying belt 18 may discharge into the chute, thus permitting such discharge to drop into the tubular housing 14, where it encounters the screw conveyor 19, the latter being of the double-bladed form mounted on a shaft 20 extending from the forward end of the housing 14. The shaft 20 is journalled in bearings 21 swung from the frame 17 forward of the housing 14 and at its extreme forward end is provided with a bevel gear 22 which meshes with a bevel pinion 23 carried at the extremity of the transverse shaft 24, the latter being mounted in spaced bearings 25 carried by the frame 17 and being equipped at that end remote from the bevel gear 23 with a sprocket 26. A chain 27 traverses the sprocket 26 and is driven from some suitable power take-off of the harvester. Thus, the screw 19 is put in motion and all straw dropped into the casing 14 is advanced by the screw into the discharge tube 15 which is coupled to the casing 14 by means of a thimble 28 entering the rear open end of the casing 14 and the forward end of the discharge tube, to both of which it is riveted, or otherwise secured. The spiral blades of the screw conveyor 19 terminate at their rear ends in toe plates 29 which are disposed in the zone of the thimble and which act to press the straw forward and to more or less compress it in the discharge tube, the rear end of which is closed by a swinging gate 30, hinged at its upper edge, as indicated at 31, and yieldingly impelled to closed position by springs 32, anchored to the gate on diametrically opposite sides and terminally connected with stems 33 passing through ears 34 on diametrically opposite sides of the discharge tube, the stems being exteriorly threaded and having attached to them the wing nuts 35 which bear on the forward faces of the ears 34. The stems may thus be axially adjusted by rotation of the wing nuts and thus the tension on the springs 32 increased or reduced. The housing 14 and the discharge tube 15 are axially aligned and are arranged at an upward inclination, so that while the forward end of the conveyor housing is approximately at the floor level of the trailer, the rear end of the discharge tube is above the level of the front wall thereof. Thus the straw, in passing out of the discharge tube, is dropped into the trailer.

The trailer is provided with ground wheels 36 at the rear and with caster wheels 37 at the forward end and is closed at the rear end by means of a tail gate 38 which when released may drop with its upper edge in contact with the ground, so that it is disposed at a downward inclination and will permit ready access to the interior of the trailer.

A flexible covering 39 is provided in the trailer and covers the floor thereof, as well as the inner face of the tail gate. This covering is made preferably from canvas and at the forward end, as indicated at 40, constitutes the forward wall for the trailer body. The free edge of the covering or flexible member 39 is bound, as indicated at 41, to enclose a flexible strand 42, of rope or its equivalent, this strand terminating in the rings or eyes 43, with elastic inserts 44 interposed, these inserts consisting preferably of springs which connect the flexible member 42 with the rings 43. The rings 43 are engageable over the upwardly extending extremities 45 of the forward corner posts of the body.

In the operation of the invention, the straw is transferred to the chute or housing member 16 by the conveyor member 18 and then drops into the housing or casing 14 and is advanced by the conveyor into the discharge tube 16 from which it is ejected by forcing the gate 30 to open position. The springs 32 which yieldingly hold the gate in closed position, ensure the straw being subjected to a certain degree of compression before being ejected. Therefore, as it forces open the gate, it is more or less in a condensed or compact mass and thus is in this condition when it falls into the trailer 11.

In removing the straw from the trailer, the tail gate may be lowered, and the covering 39 released from its connections with the posts, when the forward end may be pulled to the rear and thus the whole contents of the trailer drawn out onto the ground. If, however, it is desired to load the straw into wagons or other vehicles, this may be conveniently done with the tail gate lowered, or with the tail gate in raised position, if the transfer is to be over the sides of the trailer.

By having the covering member 39 function as the forward wall of the trailer, no damage to the discharge chute 16 will result in ground unevenness as the whole apparatus passes over the ground, since if the trailer is passing over a mound when the harvester is passing through a depression, the flexible forward wall of the trailer will yield to the pressure that is imposed by the discharge chute under such conditions.

The invention having been described, what is claimed as new and useful is:

1. In combination with a harvester, a straw gathering trailer for the same connected with the harvester at the rear thereof and in spaced relation thereto, and a straw transfer mechanism comprising a feed screw in communication with the discharge of the harvester, and a discharge tube arranged in continuation of the feed screw with its rear end disposed over the trailer.

2. In combination with a harvester, a straw gathering trailer for the same connected with the harvester at the rear thereof and in spaced relation thereto, and a straw transfer mechanism comprising a feed screw in communication with the discharge of the harvester, and a discharge tube arranged in continuation of the feed screw with its rear end disposed over the trailer, the feed tube being open-ended and having a yieldingly mounted door closing said open end.

3. In combination with a harvester, a straw gathering trailer for the same connected with the harvester at the rear thereof and in spaced relation thereto, and a straw transfer mechanism comprising a feed screw in communication with the discharge of the harvester, and a discharge tube arranged in continuation of the feed screw with its rear end disposed over the trailer, the feed tube being open-ended and having a yieldingly mounted door closing said open end, said door having a hinged mounting and being provided with tensioning springs secured to it on diametrically opposite sides and terminally anchored to the feed tube.

4. In combination with a harvester, a straw gathering trailer for the same connected with the harvester at the rear thereof and in spaced relation thereto, and a straw transfer mechanism comprising a feed screw in communication with the discharge of the harvester, and a discharge tube arranged in continuation of the feed screw with its rear end disposed over the trailer, the feed screw being operatively connected with the harvester mechanism for rotation by the latter.

5. In combination with a harvester, a straw gathering trailer for the same connected with the harvester at the rear thereof and in spaced relation thereto, and a straw transfer mechanism comprising a feed screw in communication with the discharge of the harvester, and a discharge tube arranged in continuation of the feed screw with its rear end disposed over the trailer, the feed screw being operatively connected with the harvester mechanism for rotation by the latter, and it and the feed tube being arranged at an upward inclination to dispose the forward end of the feed screw at approximately the level of the floor of the trailer and the rear end of the feed tube above the sides thereof.

6. In combination with a harvester, a straw gathering trailer for the same connected with the harvester at the rear thereof and in spaced relation thereto, and a straw transfer mechanism comprising a feed screw in communication with the discharge of the harvester, and a discharge tube arranged in continuation of the feed screw with its rear end disposed over the trailer, the trailer comprising a wheeled platform with upstanding bounding side walls of which the forward wall which is below the feed tube is of flexible material.

CHARLES R. ADAMS.